(12) United States Patent
Bestaoui-Spurr et al.

(10) Patent No.: US 10,961,444 B1
(45) Date of Patent: Mar. 30, 2021

(54) METHOD OF USING COATED COMPOSITES CONTAINING DELAYED RELEASE AGENT IN A WELL TREATMENT OPERATION

(71) Applicant: Baker Hughes Oilfield Operations LLC, Houston, TX (US)

(72) Inventors: Naima Bestaoui-Spurr, The Woodlands, TX (US); Marty J. Usie, Youngsville, LA (US); Frances H. DeBenedictis, Spring, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 16/672,161

(22) Filed: Nov. 1, 2019

(51) Int. Cl.
| | |
|---|---|
| *E21B 37/06* | (2006.01) |
| *C09K 8/80* | (2006.01) |
| *C09K 8/524* | (2006.01) |
| *C09K 8/536* | (2006.01) |
| *C09K 8/92* | (2006.01) |
| *E21B 43/267* | (2006.01) |

(52) U.S. Cl.
CPC ............ *C09K 8/805* (2013.01); *C09K 8/524* (2013.01); *C09K 8/536* (2013.01); *C09K 8/92* (2013.01); *E21B 37/06* (2013.01); *E21B 43/267* (2013.01)

(58) Field of Classification Search
CPC ........ C09K 8/805; C09K 8/524; C09K 8/536; C09K 8/92
See application file for complete search history.

(56) References Cited

U.S. PATENT DOCUMENTS

| | | |
|---|---|---|
| 1,570,537 A | 1/1926 | Teitsworth |
| 2,378,155 A | 6/1945 | Newsome |
| 3,179,170 A | 4/1965 | Burtch et al. |
| 3,283,817 A | 11/1966 | Roberts |
| 3,722,592 A | 3/1973 | Bucaram et al. |
| 3,782,469 A | 1/1974 | Fulford |
| 3,850,248 A | 11/1974 | Carney |
| 3,987,850 A | 10/1976 | Fitch |
| 3,991,827 A | 11/1976 | Schall |

(Continued)

FOREIGN PATENT DOCUMENTS

| | | |
|---|---|---|
| CA | 1262507 A | 10/1989 |
| EP | 0540204 A2 | 5/1993 |

(Continued)

OTHER PUBLICATIONS

P.J.C. Webb AEA Technology PLC, T.A., et al; Revolutionary New Chemical Delivery System for Fractured, Gravel Packed and Prepacked Screen Wells; SPE 38164; 1997.

(Continued)

*Primary Examiner* — Silvana C Runyan
(74) *Attorney, Agent, or Firm* — John Wilson Jones; Jones Delflache LLP

(57) ABSTRACT

A composite for controlling the release of a well treatment agent or for inhibiting or preventing the formation of contaminants into a fluid or a surface within a reservoir contains a well treatment agent immobilized on a surface of the support or into the pores of a porous support. The composite is at least partially coated with an organic polymer or inorganic material. The composite exhibits sufficient strength for the composite to be used as a proppant or in conjunction with a proppant.

25 Claims, 4 Drawing Sheets

(56) References Cited

U.S. PATENT DOCUMENTS

| | | |
|---|---|---|
| 4,008,763 A | 2/1977 | Lowe, Jr. |
| 4,013,587 A | 3/1977 | Fischer et al. |
| 4,108,779 A | 8/1978 | Carney |
| 4,109,721 A | 8/1978 | Slusser |
| 4,264,329 A | 4/1981 | Beckett |
| 4,352,741 A | 10/1982 | Wernau |
| 4,390,456 A | 6/1983 | Sanchez et al. |
| 4,552,591 A | 11/1985 | Millar |
| 4,582,131 A | 4/1986 | Plummer et al. |
| 4,660,645 A | 4/1987 | Newlove et al. |
| 4,670,166 A | 6/1987 | McDougall et al. |
| 4,738,897 A | 4/1988 | McDougall et al. |
| 4,905,762 A | 3/1990 | Zilch |
| 4,986,353 A | 1/1991 | Clark et al. |
| 5,073,276 A | 12/1991 | Newlove et al. |
| 5,102,558 A | 4/1992 | McDougall et al. |
| 5,187,011 A | 2/1993 | Manalastas et al. |
| 5,224,543 A | 7/1993 | Watkins et al. |
| 5,225,123 A | 7/1993 | Torobin |
| 5,243,190 A | 9/1993 | Bandy et al. |
| 5,741,758 A | 4/1998 | Pakulski |
| 5,758,725 A | 6/1998 | Streetman |
| 5,892,147 A | 4/1999 | Games et al. |
| 5,893,416 A | 4/1999 | Read |
| 5,922,652 A | 7/1999 | Kowalski et al. |
| 5,964,291 A | 10/1999 | Bourne et al. |
| 6,025,302 A | 2/2000 | Pakulski |
| 6,100,221 A | 8/2000 | Poelker et al. |
| 6,209,643 B1 | 4/2001 | Nguyen et al. |
| 6,209,646 B1 | 4/2001 | Reddy et al. |
| 6,279,656 B1 | 8/2001 | Sinclair et al. |
| 6,326,335 B1 | 12/2001 | Kowalski et al. |
| 6,331,508 B1 | 12/2001 | Pakulski |
| 6,380,136 B1 | 4/2002 | Bates et al. |
| 6,439,310 B1 | 8/2002 | Scott, III et al. |
| 6,527,051 B1 | 3/2003 | Reddy et al. |
| 6,613,899 B1 | 9/2003 | Kuzzee et al. |
| 6,645,769 B2 | 11/2003 | Tayebi et al. |
| 6,723,683 B2 | 4/2004 | Crossman et al. |
| 6,866,797 B1 | 3/2005 | Martin et al. |
| 7,028,776 B2 | 4/2006 | Kirk |
| 7,216,711 B2 | 5/2007 | Nguyen et al. |
| 7,270,184 B2 | 9/2007 | Kotlar et al. |
| 7,347,260 B2 | 3/2008 | Ferguson et al. |
| 7,380,606 B2 | 6/2008 | Pursley et al. |
| 7,419,937 B2 | 9/2008 | Rimmer et al. |
| 7,426,961 B2 | 9/2008 | Stephenson et al. |
| 7,459,209 B2 | 12/2008 | Smith et al. |
| 7,491,682 B2 | 2/2009 | Gupta et al. |
| 7,493,955 B2 | 2/2009 | Gupta et al. |
| 7,494,711 B2 | 2/2009 | Kaufman et al. |
| 7,500,522 B2 | 3/2009 | Skibinski et al. |
| 7,560,690 B2 | 7/2009 | Stray et al. |
| 7,598,209 B2 | 10/2009 | Kaufman et al. |
| 7,686,081 B1 | 3/2010 | Becker |
| 7,896,078 B2 | 3/2011 | Wang et al. |
| 8,596,354 B2 | 12/2013 | Hartshorne et al. |
| 8,664,168 B2 | 3/2014 | Steiner |
| 8,853,619 B2 | 10/2014 | Preudhomme et al. |
| 9,010,430 B2 | 4/2015 | Darby et al. |
| 9,029,300 B2 | 5/2015 | Gupta |
| 9,102,860 B2 | 8/2015 | Cawiezel et al. |
| 9,874,080 B2 | 1/2018 | Gupta et al. |
| 9,976,070 B2 | 5/2018 | Gupta et al. |
| 10,400,159 B2 | 9/2019 | Gupta |
| 10,413,966 B2 | 9/2019 | Murugesan et al. |
| 2001/0007351 A1 | 7/2001 | Acker et al. |
| 2002/0128157 A1 | 9/2002 | Bates et al. |
| 2003/0006036 A1 | 1/2003 | Malone et al. |
| 2004/0043906 A1 | 3/2004 | Heath et al. |
| 2004/0060702 A1 | 4/2004 | Kotlar et al. |
| 2004/0074646 A1 | 4/2004 | Kotlar et al. |
| 2004/0224155 A1 | 11/2004 | Barron et al. |
| 2004/0244969 A1 | 12/2004 | Kotlar et al. |
| 2005/0022991 A1 | 2/2005 | Rao |
| 2005/0028976 A1 | 2/2005 | Nugyen et al. |
| 2005/0034868 A1 | 2/2005 | Frost et al. |
| 2005/0115710 A1 | 6/2005 | Kotlar et al. |
| 2006/0065396 A1 | 3/2006 | Dawson et al. |
| 2006/0091572 A1 | 5/2006 | Santra et al. |
| 2006/0124301 A1 | 6/2006 | Gupta |
| 2006/0124302 A1 | 6/2006 | Gupta et al. |
| 2006/0177661 A1* | 8/2006 | Smith ............ C04B 35/48 428/403 |
| 2007/0036977 A1 | 2/2007 | Sinclair et al. |
| 2007/0062101 A1 | 3/2007 | Delamotte et al. |
| 2007/0095528 A1 | 5/2007 | Ziauddin et al. |
| 2007/0173417 A1 | 7/2007 | Kaufman et al. |
| 2007/0202318 A1 | 8/2007 | Smith et al. |
| 2008/0035339 A1 | 2/2008 | Welton et al. |
| 2008/0035340 A1 | 2/2008 | Welton et al. |
| 2008/0053657 A1 | 3/2008 | Alary et al. |
| 2008/0058228 A1 | 3/2008 | Wilson |
| 2008/0058229 A1 | 3/2008 | Berkland et al. |
| 2008/0078547 A1 | 4/2008 | Sinclair et al. |
| 2008/0182765 A1 | 7/2008 | Pershikova et al. |
| 2008/0210421 A1 | 9/2008 | Wilson et al. |
| 2008/0217012 A1 | 9/2008 | Delorey et al. |
| 2008/0287324 A1 | 11/2008 | Pursley et al. |
| 2009/0025470 A1 | 1/2009 | Green et al. |
| 2009/0114247 A1 | 5/2009 | Brown et al. |
| 2009/0131285 A1 | 5/2009 | Wang et al. |
| 2009/0291861 A1 | 11/2009 | Sawdon |
| 2009/0325825 A1 | 12/2009 | Gupta et al. |
| 2010/0059224 A1 | 3/2010 | Palamara et al. |
| 2010/0065275 A1 | 3/2010 | McGowen et al. |
| 2010/0130385 A1 | 5/2010 | Guzmann et al. |
| 2010/0175875 A1 | 7/2010 | Becker et al. |
| 2010/0304418 A1 | 12/2010 | Moussavi et al. |
| 2010/0307745 A1 | 12/2010 | Lafitte et al. |
| 2011/0146974 A1 | 6/2011 | Hartshorne et al. |
| 2012/0012326 A1 | 1/2012 | Darby et al. |
| 2012/0292025 A1 | 11/2012 | Stoll |
| 2012/0318515 A1 | 12/2012 | Cawiezel et al. |
| 2013/0029883 A1 | 1/2013 | Dismuke et al. |
| 2013/0123149 A1 | 5/2013 | Berkland et al. |
| 2013/0126158 A1 | 5/2013 | Gupta et al. |
| 2013/0341012 A1 | 12/2013 | Belani et al. |
| 2014/0048273 A1 | 2/2014 | Southwick et al. |
| 2014/0190692 A1 | 7/2014 | Hibbeler et al. |
| 2014/0209304 A1 | 7/2014 | Reed et al. |
| 2014/0262247 A1* | 9/2014 | Duenckel ............ E21B 43/26 166/250.12 |
| 2014/0305650 A1 | 10/2014 | Song et al. |
| 2015/0075792 A1 | 3/2015 | Brandl et al. |
| 2015/0198010 A1 | 7/2015 | Doan et al. |
| 2015/0330197 A1 | 11/2015 | Brannon et al. |
| 2015/0369822 A1 | 12/2015 | Strandburg et al. |
| 2016/0030916 A1 | 2/2016 | Shen et al. |
| 2016/0046855 A1 | 2/2016 | Mastrangelo et al. |
| 2016/0304770 A1* | 10/2016 | Nguyen ............ C09K 8/92 |
| 2017/0158952 A1* | 6/2017 | Nguyen ............ C09K 8/80 |
| 2017/0226404 A1 | 8/2017 | Gupta |
| 2017/0350236 A1 | 12/2017 | Shen et al. |
| 2018/0134939 A1 | 5/2018 | Gupta et al. |
| 2019/0161672 A1 | 5/2019 | Bottiglieri et al. |
| 2020/0115609 A1 | 4/2020 | Pop et al. |

FOREIGN PATENT DOCUMENTS

| | | |
|---|---|---|
| EP | 1277051 B1 | 8/2006 |
| GB | 2298440 A | 9/1996 |
| GB | 2308129 A | 6/1997 |
| GB | 2520018 A | 5/2015 |
| WO | 97/45625 A1 | 12/1997 |
| WO | 99/36668 A1 | 7/1999 |
| WO | 99/54592 A1 | 10/1999 |
| WO | 200011949 A1 | 3/2000 |
| WO | 2001081914 A1 | 11/2001 |
| WO | 2002040827 A1 | 5/2002 |
| WO | 2004106942 A2 | 12/2004 |
| WO | 2005/017313 A1 | 2/2005 |
| WO | 2006129258 A1 | 12/2006 |
| WO | 2008032067 A1 | 3/2008 |

(56) References Cited

FOREIGN PATENT DOCUMENTS

| WO | 2010007390 A2 | 1/2010 |
|---|---|---|
| WO | 2015174996 A1 | 11/2015 |
| WO | 2016014310 A1 | 1/2016 |
| WO | 2016089599 A1 | 6/2016 |
| WO | WO2016137922 A1 | 9/2016 |
| WO | 2019089043 A1 | 5/2019 |

OTHER PUBLICATIONS

P.J.C. Webb AEA Technology PLC, T.A., et al; Economic and Technical Advantages of Revolutionary New Delivery System for Fractured and Gravel Packed Wells; SPE 38548; 1997.
P.J.C. Webb AEA Technology PLC, T.A., et al; Economic and Technical Features of a Revolutionary Chemical Scale Inhibitor Delivery Method for Fractured and Gravel Packed Wells: Comparative Analysis of Onshore and Offshore Subsea Applications; SPE 39451; 1998.
Norris, et al; Maintaining Fracture Performance Through Active Scale Control; SPE 68300; 2001.
Norris, et al; Hydraulic Fracturing for Reservoir Management Production Enhancement, Scale Control and Asphaltine Prevention; SPE 71655; 2001.
McInnich, et al; New Relationship Between Oil Company and Service Company Rejuvenates a Mature North Sea Gas Field; SPE 78327; 2002.
Szymczak, et al; Long-Term Scale Inhibition Using a Solid Scale Inhibitor in a Fracture Fluid; SPE 102720; 2006.
Gupta, et al; Solid Production Chemicals Added With the Frac for Scale, Paraffin and Asphaltene Inhibition; SPE 119393; 2009.
Gupta, et al; Multi-Year Scale Inhibition from a Solid Inhibitor Applied during Stimulation; SPE 115655; 2008.
Smith, et al; Solid Paraffin Inhibitor Pumped in a Hydraulic Fracture Provides Long-Term Paraffin Inhibition in Permian Basin Wells; SPE 124868; 2009.
Pallanich; Slow-release medication relieves deepwater headache; Offshore Engineer; Aug. 2007.
Szymczak et al; Treat production problems before they occur; E&P; Jul. 2008.
Weirich et al., Field Application of Chemically Treated Substrate in Pre-Packed Well Screen; SPE 141054; Society of Petroleum Engineers; Manama Bahrain, Mar. 2011.
Sasol Germany Gmbh; "Boehmite, High Purity Alumina and Hydrotalcite"; Sasol Germany GmbH; Hamburg Germany, Aug. 2007.
SASOL; "Aluminum Oxide, A1203"; Material Safety Data Sheet; version 1.2; SASOL; Hamburg Germany; Aug. 2007.
Carbo Ceramics "Carbo EconoProp"; Carbo Ceramics; Houston, Texas; 2010.
D.M. Frigo et al; Chemical Inhibition of Halite Scaling in Topsides Equipment; SPE 60191; 2000.
Berlin et al., "Engineered Nanoparticles for Hydrocarbon Detection in Oil-Field Rocks," SPE 141528 Apr. 11, 2011 (in 2 parts).
Nyhavn, et al. "Permanent Tracers Embedded in Downhole Polymers Prove Their Monitoring Capabilities in a Hot Offshore Well," SPE 135070, Sep. 19, 2010.
Fuller, et al., Applying Biochemistry Concepts to the Analysis of Oilfield Produced Fluids, SPE 124749, Oct. 2009.
Optidose (TM) 1000 Traceable Polymer, a Tool for Maintaining Maximum Heat Transfer, Technical Data Sheet, Jul. 2012, The Dow Chemical Co.
Accent (TM) Traceable Scale Inhibitor System, Sep. 2010, The Dow Chemical Co., Jun. 2012.
Himes, et al., Search4Oil, Comparative Study of Flowback Analysis Using Polymer Concentrations and Fracturing—Fluid Tracer Methods: A Field Study, SPE 101614-PA, May 2008.
Liang, F., et al., "A comprehensive review on proppant technologies," Petroleum 2015, Nov. 5, 2015.
Frenier, W.W., et al., A Multifaceted Approach for Controlling Complex Deposits in Oil and Gas Production, Society of Petroleum Engineers, Sep. 22, 2010.

\* cited by examiner

METHOD OF USING COATED COMPOSITES CONTAINING DELAYED RELEASE AGENT IN A WELL TREATMENT OPERATION

FIELD

A method for releasing a well treatment agent into a well or into a conduit extending to or from a well is provided wherein a composite of at least one well treatment agent and a substrate for the well treatment agent is introduced into the well or conduit. The composite is at least partially covered with a coating. The well treatment agent is slowly released from the substrate and into the well or conduit through fissures of the coating.

BACKGROUND

Hydraulic fracturing, a common method for producing hydrocarbons from a well, consists of pumping a fluid into a subterranean formation penetrated by the well at a sufficient pressure to cause the formation or enlargement of fractures. Downhole conditions contribute to the formation and deposition of scales, salts, gas hydrates and paraffins; precipitation of asphaltenes; formation of emulsions (both water-in-oil and oil-in-water); and formation of rust in the wellbore, production string and other tubulars within the well and conduits extending from and to the well. These contaminants decrease permeability of the subterranean formation and reduce well productivity. In acute situations, the lifetime of production equipment is shortened. In order to rid such contaminants from wells, tubulars, flow conduits and equipment, it typically is necessary to stop production. This is both time-consuming and costly.

Several methods have been employed for introducing well treatment agents into production wells. For instance, a liquid well treatment agent may be forced into the formation by application of hydraulic pressure from the surface which forces the treatment agent into the targeted zone. Alternatively, the delivery method may consist of placing a solid well treatment agent into the producing formation in conjunction with a hydraulic fracturing operation. These liquid injection treatments provide little to no protection deep into the reservoir. Another disadvantage of these methods is the difficulty in releasing the well treatment agent into the well over a sustained period of time. As a result, treatments must repeatedly be undertaken to ensure that the requisite level of treatment agent is continuously present in the well. Such treatments result in lost production revenue due to down time and increase costs by enhancing the likelihood of intervention/remedial treatments.

U.S. Pat. Nos. 7,491,682; 7,598,209; 7,493,955; 9,010,430; 9,029,300; and 9,656,237 disclose the successful use of composites for the slow release of well treatment agents. A disadvantage of such composites is the inability of prolonged release of the well treatment agent into a targeted area. This is particularly evident in hydraulic fracturing operations. Methods of improving the slow or delayed release of well treatment agents at targeted locations as well as improved methods for delivering such treatment agents into targeted locations in wells, formations, conduits and/or vessels have been sought.

SUMMARY

In an embodiment, a method of fracturing a subterranean formation penetrated by a wellbore is provided wherein a fluid is pumped into the wellbore under pressure. The fluid comprises (i) proppant and (ii) a composite comprising a well treatment agent immobilized onto a surface of a support or into the pores of a porous support, wherein at least a portion of the surface of the composite is coated with an organic polymer or inorganic material. The proppant and composite are transported into an enlarged or created fracture in the formation and hydrocarbon fluids are produced from the enlarged or created fracture. Stress is applied to the proppant and composite and fissures are created in the coating of the composite. The well treatment agent is released from the support through the created fissures in the coating while the created or enlarged fracture remains open with the proppant, the fissures in the coating being the resultant of pressure applied onto the composite. The formation of contaminants in the wellbore are inhibited or minimized by the released well treatment agent.

Another embodiment is drawn to a method of controlling the rate of release of a hydrocarbon soluble, water soluble or both hydrocarbon and water soluble well treatment agent into a dendritic fracture extending from a primary fracture during a hydraulic fracturing operation. In this embodiment, a composite is pumped into near field (near wellbore) primary fractures as well as into far field secondary fractures propped open with a proppant. The composite comprises a well treatment agent immobilized onto a surface of a support or into the pores of a porous support. At least a portion of the surface of the composite is coated with an organic polymer or inorganic material. The particle size of the coated composite may be greater than or equal to the particle size of the proppant. In some instances, the particle size of the coated composite may be less than or equal to the particle size of the proppant. The well treatment agent is released from the composite through fissures created in the coating from the applied stress.

Another embodiment is drawn to a method of stimulating a subterranean formation penetrated by a wellbore wherein a composite comprising a well treatment agent immobilized onto a surface of a support or into the pores of a porous support is pumped under pressure into the wellbore. At least a portion of the surface of the composite is coated with an organic polymer or inorganic material. The composite is transported into an enlarged or created fracture in the formation and hydrocarbons are produced from the fracture. Stress is applied to the composite and fissures are created in the coating. The well treatment agent is released from the support through the created fissures in the coating. Formation of contaminants in the wellbore are inhibited or minimized by the released well treatment agent.

Another embodiment is drawn to a method of controlling release of a well treatment agent into a well, into a conduit extending to or from a well or onto the surface of a subterranean formation penetrated by a well wherein a composite comprising the well treatment agent immobilized onto a surface of a support or into the pores of a porous support is pumped into the well. At least a portion of the surface of the composite is coated with an organic polymer or inorganic material. The formation of contaminants are inhibited or controlled within the well by slowly releasing the immobilized well treatment agent from the support into the well through fissures of the coating.

In still another embodiment, a method of controlling the rate of release of a well treatment agent into a well or onto the surface of a subterranean formation penetrated by a well during a stimulation or sand control operation is provided wherein particulates capable of withstanding pressures of at least 2,000 psi are pumped into the well along with a composite comprising the well treatment agent immobilized onto a surface of a support or into the pores of a porous support. At least a portion of the surface of the composite is coated with an organic polymer or inorganic material. The well treatment agent is released into the subterranean formation through fissures of the coating caused by the exerted pressure.

DRAWINGS

FIG. 1 and FIG. 2 demonstrate the effect of the coated composites described herein on the inhibition of asphaltene precipitation in crude oil.

DETAILED DESCRIPTION

Figure 1:
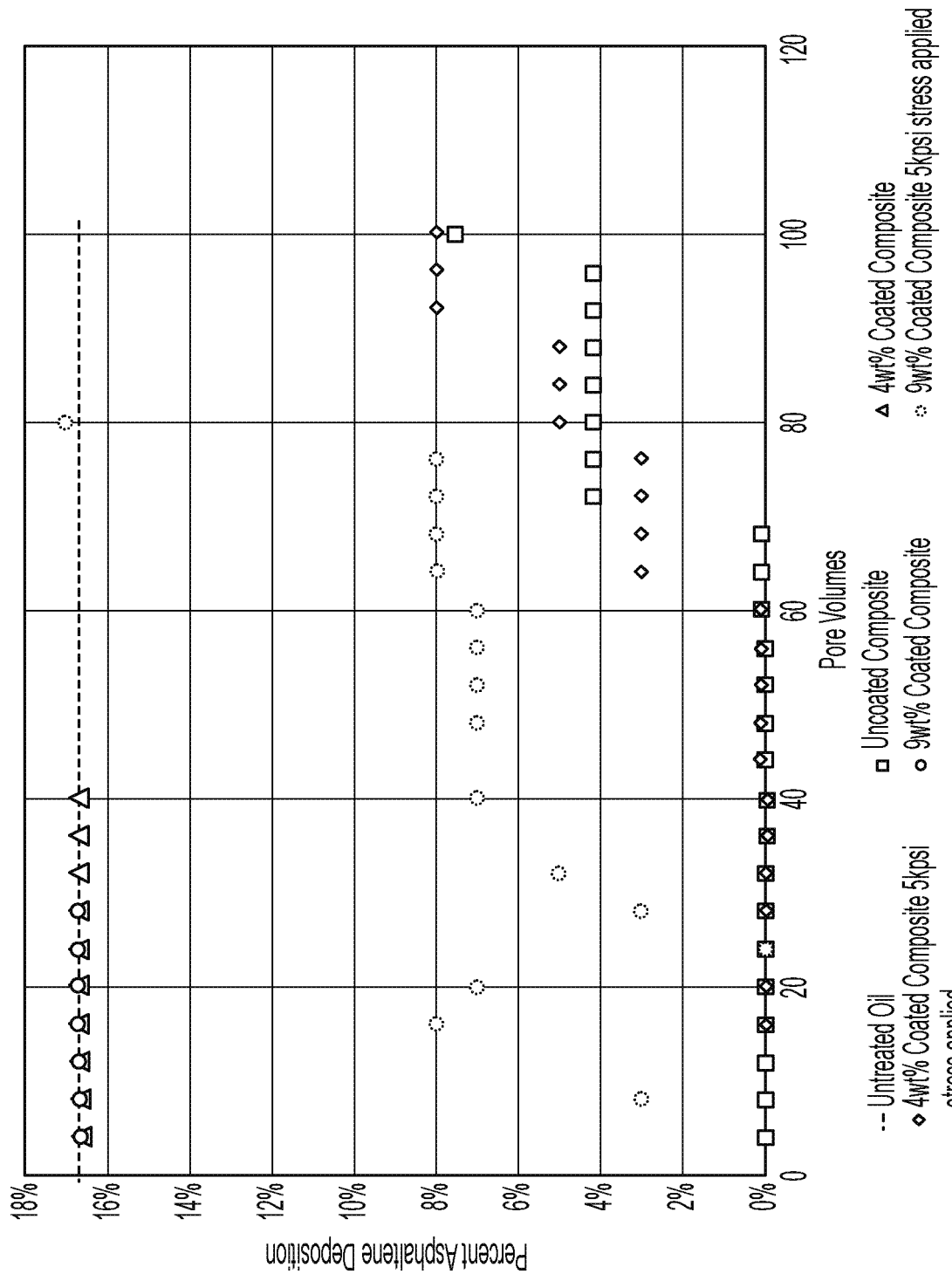

Characteristics and advantages of the present disclosure and additional features and benefits will be readily apparent to those skilled in the art upon consideration of the following detailed description of exemplary embodiments of the present disclosure and referring to the accompanying figure. It should be understood that the description herein, being of exemplary embodiments, are not intended to limit the claims. On the contrary, the intention is to cover all modifications, equivalents and alternatives falling within the spirit and scope of the claims. Changes may be made to the particular embodiments and details disclosed herein without departing from such spirit and scope.

As used herein, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

All ranges disclosed herein are inclusive of the endpoints. Unless stated otherwise, any range of values within the endpoints is encompassed. For example, where the endpoints of a range are stated to be from 1 to 10, any range of values, such as from 2 to 6 or from 3 to 5 will be defined by the range. The suffix "(s)" as used herein is intended to include both the singular and the plural of the term that it modifies, thereby including at least one of that term. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context.

A composite for use in the disclosure comprises at least one well treatment agent immobilized onto a surface of a support or into the pores of a porous support. At least a portion of the surface of the composite is coated with a resin, plastic, sealant or cement. The coating preferably surrounds the entire surface of the composite though the coating may cover only a portion of the surface of the composite. Where the coating only surrounds a portion of the surface of the composite, it is preferred that at least 50% and usually at least 75% of the total surface area of the composite is coated.

The coating shields the well treatment agent immobilized onto the surface of the support or into the pores of a porous support from the environs until the coating develops cracks or fissures. The well treatment agent then is released into the environs through the crack(s) or fissure(s).

The coating strengthens the composite, protects the well treatment agent from harsh environmental conditions and prolongs the time which the well treatment agent is released into the environs. This allows for more well treatment agent to be transferred bottomhole.

The enhanced strength of the composite enables delayed release of the well treatment agent into the environs until the coating is cracked under elevated stress. As such, the coated composite is of particular value in those treatment operations where the formation is subjected to high compressive forces, such as in stimulation operations like hydraulic fracturing, slickwater fracturing, acid fracturing and frac packing; the well treatment agent being released from the composite during such operations.

In a preferred embodiment, the coated composite is pumped into the well as a component of a fracturing fluid. The fluid may be pumped under pressure to create or enlarge a fracture. Further, the fluid may be pumped into a well wherein fractures have already been created or enhanced in the formation. The composite may be transported into the fracture. The composite is capable of withstanding elevated in-situ pressures. Over time, the pressure creates fissures (or cracks) in the coating. The well treatment agent disassociates from the support and is gradually released into the environs through the fissure(s). The released well treatment agent inhibits or prevents the formation of undesirable contaminants within the well (including within produced fluids). The coating prolongs the time of release of the well treatment agent into the fracture (compared to a substantially similar composite which is uncoated).

Typically, the coating on the composite ensures the treatment agent is not released until elevated stress levels are reached. In an embodiment, the coating hardens, isolates and/or protects the composite from adverse formation or wellbore conditions when subjected to elevated stresses. As such, the coated composites may function as an intermediate strength proppant. In an embodiment, the coated composites may be subjected to elevated stresses of 1,000 psi or 2,000 or 4,000 psi or greater, typically at least 6,000 psi, often at least 8,000 psi, in other instances at least 10,000 psi, in other instances at least 12,000 psi and other cases at least 15,000 psi and in some instances even higher stresses such as 20,000 psi or higher. In an embodiment, the amount of stress to which the coated composites may be exposed before fissure(s) are created is first determined. The well treatment agent is then released from the composite through the fissures once the pre-determined stress is reached downhole.

The coated composite is particularly useful in wells which experience closure stresses in the same range or proximity as the maximum stress levels which the coated composites can withstand. The coated composites exhibit no or minimum conductivity losses at increased loadings.

In a preferred embodiment, the coated composites may be used in near wellbore fractures. Further, since they may be exposed to higher stress levels, the composites are useful in the inhibition of contaminants in created or enhanced fracture in the deepest part of the well. The slow and controlled release of the well treatment agent reduces precipitates and lowers conductivity damage to plugging. Controlled release of the well treatment agent from the composite through the fissure provides for a certain amount of well treatment agent when needed for control of contaminants, preserving the rest of the well treatment agent for subsequent release. Such slow and controlled release of the well treatment agent provides increased protection as the well ages.

Further, the high crush resistance of the coated composite enables controlled release of the well treatment agent through the fissure(s); the portion of the well treatment agent retained within the composite on the surface of the support or into the pores of the porous support may be released at later times. The delay mechanism evident in the slow release of the well treatment agent lowers conductivity damage to plugging and provides increased protection to the well as it ages. As such, the coated composites provide a cost effective long term flow assurance solution over methods presently used while increasing hydrocarbon recovery.

The particle size of the coated composite may be of any mesh size. In an embodiment, for instance, the particle size of the coated composite may be 20/40; 16/30; 3/40; 40/70, etc. vary. In an embodiment, the particle size of the coated composite, such as at far field, may be less than 150 µm, including less than 100 µm and often less than 50 µm.

In an embodiment, the specific gravity of the coated composite may be from 1.06 to 4.0 g/cc.

In an embodiment, the stress level to which the coated composite is subjected may be dependent on the amount and/or thickness of coating on the composite. In some cases, the layer of coating on the composite may constitute between from about 1 to about 15 percent, for instance from about 4 to about 10 percent, to the total mass of the coated composite. In an embodiment, the thickness of the coating applied on the surface of the composite may be from about 0.5 µm to about 1 µm, typically from about 1 µm to about 500 µm. The coating imparts resistance to the composite and improves crush strength thereby minimizing defragmentation of the composites during downhole operations as recited herein. In an embodiment, increasing the thickness of the coating on the composite enables the coated composite to withstand higher compressive forces. The crush resistance of the coated composite at elevated pressures enables slow release of the well treatment agent(s) while fracture faces remain propped open.

In an embodiment, the coated composite exhibits a strength much higher than that of a substantially similar composite though uncoated composite. The coated composite has been demonstrated to exhibit proppant like characteristics using API standard testing protocols.

While the coated composite may function by itself as a proppant, in some instances the coated composite does not exhibit as high as strength exhibited by a conventional proppant such as sand, ceramic, bauxite and ultra lightweight proppants having an apparent specific gravity less than or equal to 2.45. In an embodiment, the composite may be admixed with other conventional proppants. The composite provides delivery of the well treatment agent into the fracture while the conventional proppant keeps the fracture from closing. Mixtures of the coated composite and conventional proppant thus provide long term flow assurance without impairing conductivity.

In another embodiment, the coated composite may be pumped into the well in a fluid which also contains a conventional proppant (either coated or uncoated); the conventional proppant having strength capable of withstanding higher compressive forces than the coated composite. The size of the coated composite enables the coated composite to be premixed in the early stages of a fracturing operation. The coated composite can be added directly to the proppant blender tub or optionally slurried in with a brine or viscosified aqueous slurry. The coated composite is of sufficient strength such that it does not affect fracture conductivity. Release of the well treatment agent from the support through the fissure(s) may occur when the stress applied to the coated composite exceeds the maximum stress and crush resistance that the coating can withstand before showing some cracks. At that point, the well treatment agent disassociates from the immobilized support through the fissures created by the application of stress onto the coated composite. During and after release of the well treatment agent, the fracture may remain open by the proppant until compressive forces exerted on the proppant crush or otherwise make the proppant ineffective. The slow release of the well treatment agent from the fissure(s) of the coating may continue while permeability of the proppant pack is retained.

In an embodiment, the coated composites may be used with any of the composites referenced above which have not been coated and which exhibit the ability to withstand greater than 20 psi stress without breaking. In an embodiment, the coating and support of the composite may be selected so as to provide a continuum of release of well treatment agent(s) as compressive forces within the well increase. Thus, the well treatment agent(s) may be released into the well and produced fluids over a wide host of compressive forces. For example, at low pressures, the immobilized well treatment agents of the uncoated composites may be released from their support. As stresses are elevated, the immobilized well treatment agent may be released from the coated composites through the fissure(s) in the coating of the composite. In an example, the use of the coated composites with non-coated composites enhances the duration of the life of the well by providing continual release of the well treatment agent(s) at pressures greater than about 1200 psi, API RP 56 or API RP 60.

In some instances, the coated composite may be pumped into the well in different stages from those of a proppant laden fluid.

In an embodiment, the coating may be an organic polymer which may be cured, partially cured, or uncured. Suitable organic polymers may include thermoplastic as well as thermosetting resins.

Exemplary thermoplastics include polyethylene, acrylonitrile-butadiene styrene, polystyrene, polyvinyl chloride, fluoroplastics, polysulfide, polypropylene, styrene acrylonitrile, nylon, and phenylene oxide.

Exemplary thermosetting resins include epoxy resins, phenolic resins, melamine formaldehyde resins, polyester resins, polyurethanes, epoxy-modified phenolic resin, and derivatives thereof.

The organic polymer comprising the coating may be crosslinked.

Preferred coatings include epoxy resins, phenolic resins (like phenol formaldehyde resins), polyurethanes, polycarbodiimides, polystyrene, polyamides, polyamide imides, furan resins, melamine formaldehyde resins or a combination thereof.

In an embodiment, the strength of the organic polymer may be increased by using a strength enhancing additive in conjunction with the organic polymer. Such additives include, but are not necessarily limited to, waste materials such as silica sand, Kevlar fibers, fly ash, sludges, slags, waste paper, rice husks, saw dust, and the like, volcanic aggregates, such as expanded perlite, pumice, scoria, obsidian, and the like, minerals, such as diatomaceous earth, mica, borosilicates, clays, metal oxides, metal fluorides, and the like, plant and animal remains, such as sea shells, coral, hemp fibers, and the like, manufactured fillers, such as silica, mineral fibers and mats, chopped or woven fiberglass, metal wools, turnings, shavings, wollastonite, nanoclays, carbon nanotubes, carbon fibers and nanofibers, graphene oxide, or graphite. For instance, the compressive strength of the composite may be increased by using a combination of the organic polymer and strength enhancing additive. As an example, the release of the well treatment agent from the coated composite may be delayed at higher stress levels (such as in deep water wells) above 12,000 psi when the coating is composed of both organic polymer and strength enhancing additive.

In another embodiment, the coating may comprise an inorganic material. Suitable materials include inorganic compounds such as those containing metal. In a preferred embodiment, the metal is zirconium or zinc. Exemplary inorganic materials include zirconium silicate as well as zinc silicate.

The coating may be applied to the composite by low temperature curing methods as well as indirect heating processes. In an embodiment, the organic polymer or inorganic material may be mixed in a vessel at elevated temperatures, typically from about 200 to about 350, preferably around 250° F. The inorganic coating may also be applied onto the support by a sol-gel reaction. For instance, a zinc silicate coating may be formed by a sol-gel reaction of sodium silicate and zinc sulfate or tetraethyl orthosilicate and zinc nitrate. The inorganic coating may then be hardened.

The coated composite does not require excessive amounts of well treatment agents. The amount of well treatment agent in the coated composite is that amount sufficient to effectuate the desired result over a sustained period of time. For instance, where the well treatment agent is a scale inhibitor, the amount of scale inhibitor present in the coated composite is that amount required to prevent, or to at least substantially reduce or inhibit the formation of scales.

Generally, the amount of well treatment agent in the coated composite is from about 0.05 to about 70, in some cases from about 0.05 to 50 weight percent, preferably from about 0.05 to about 40 weight percent, more preferably from about 0.05 to about 20 and in some cases from about 0.1 to about 15 weight percent, and in other cases from about 0.1 to about 10 weight percent, based on the total weight of the composite.

Once released into the environs, the well treatment agent may be effective for up to 6 months, in most cases greater than 9 months, typically more than 12 months or 18 months and often up to 24 months and in some cases upwards to three to five years.

In an embodiment, the well treatment agent may be immobilized onto a support or incorporated into the pores of a porous or high surface area support prior to coating.

For example, the composite may consist of a well treatment agent adsorbed onto an adsorbent substrate, such as a water-insoluble, oil-insoluble or both water and oil-insoluble adsorbent. A portion of the well treatment agent may further be absorbed into interstitial spaces of the support. The adsorption of the well treatment agent onto the solid adsorbent limits the availability of the free well treatment agent in water. In addition, the well treatment agent immobilized onto the support has limited solubility in water.

Where the support is a water-insoluble adsorbent, it may be of various kinds of commercially available high surface area materials having the affinity to adsorb the desired well treatment agent. In an embodiment, the surface area of the adsorbent of the composite may be between from about 0.5 $m^2/g$ to about 1,000 $m^2/g$ and more typically from about 0.5 to about 700, in some instances from about 0.5 to about 110 $m^2/g$ and in other instances from about 0.5 to about 60 $m^2/g$.

The adsorbent may be any of various kinds of commercially available high surface area materials onto which the well treatment agent may be adsorbed.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), ceramics, bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents. Particularly preferred are alumina, diatomaceous earth and ground walnut shells. Alumina is particularly preferred in those instances where it is desired for the coated composite to withstand high compressive stresses, including up to 20,000 psi.

Further useful as adsorbents are clays such as natural clays, preferably those having a relatively large negatively charged surface, and a much smaller surface that is positively charged. Other examples of such high surface area materials include such clays as bentonite, illite, montmorillonite and synthetic clays.

The weight ratio of well treatment agent to water-insoluble adsorbent may be between from about 9.8:0.2 to about 0.2:9.8, often from about 9:1 to about 1:9.

The composite may be prepared by adding the well treatment agent to the adsorbent and mixing until the well treatment agent is readily adsorbed and/or absorbed. The product may then be dried at elevated temperatures (for instance, from about 220° F. to about 250° F.) until the percent moisture of the resulting product is less than 3%. Suitable methods of preparing well treatment agents adsorbed and/or absorbed onto a support, such as a water-insoluble adsorbent, are disclosed in U.S. Pat. Nos. 7,491,682; 7,493,955; 7,977,283; and 8,664,168, all of which are herein incorporated by reference.

The well treatment agent is released (desorbed) from the adsorbent over time. Release of the well treatment agent into a targeted area may be controlled by the presence of the coating on the composite. The time for solubilization (desorption from the adsorbent) of the well treatment agent is increased by the presence of the release resistant layer. The well treatment agent is not, however, released into the environs until the coating contains at least one fissure(s). The well treatment agent may then be released into the environs through the fissure(s). In some instances, a fissure may be formed prior to the well treatment agent being released from the adsorbent. Once released from the adsorbent, the well treatment agent migrates from the inside of the composite into the environs through the fissure(s).

Suitable composites also include those composed of a porous particulate as support onto which or within one or more well treatment agents are immobilized. Typically, the particle size of the porous particulate is between from about 0.3 mm to about 5 mm, preferably between from about 0.4 to about 2 mm. In some instances, the amount of well treatment(s) in such coated composites is between from about 1 to about 600 ppm and may be as low as 1 ppm. Such small amounts of well treatment agent(s) may be sufficient for up to 1,000 pore volumes.

The porosity and permeability of the porous particulate is such that the well treatment agent may be absorbed into the pores of the porous particulate material. Typically, the porosity of the porous particulate is between from about 5 to about 30 volume percent. A commercially available instrument which uses mercury intrusion, such as the AutoPore Mercury Porosimeter (Micromeritics, Norcross, Ga.), for measuring the internal porosity of the particulate and the interstitial volume (of a pack) may be used to determine the porosity of the porous particulate. Generally, the amount of well treatment agent in such composites may be is from about 0.05 to about 70 (preferably from about 0.1 to about 2) weight percent based upon the total weight of the composite.

Exemplary porous particulates include those which are generally spherical and insoluble in well fluids under subterranean conditions, such as at temperatures less than about 250° C. and characterized by a porous matrix. The porous particulates may be inorganic or organics. Since the well treatment agents employed in the composites are capable of being absorbed into the interstitial spaces of the porous particulates, they may be slowly released from the porous particulates into produced fluids after a fissure is created in the coating. In some cases, the fissure may be created in the coating prior to the well treatment agent being released (desorbed) from the porous particulate. Upon release from the porous particulate, the well treatment agent may then flow from the inside of the composite into the environs through the fissure. Produced fluids are then exposed to the well treatment agent.

Suitable as porous particulates are those particulates set forth in U.S. Pat. Nos. 5,964,291 and 7,598,209, herein incorporated by reference. For instance, the porous particulate of the composite may be any naturally occurring or manufactured or engineered porous ceramic particulate, as well as any organic polymeric material, that has an inherent and/or induced porosity.

Suitable as inorganic ceramic materials are alumina, magnetic glass, titanium oxide, zirconium oxide, ceramics, silicon carbide, aluminosilicates and other silica-based materials. Examples of non-natural porous particulate materials include, but are not limited to, porous ceramic particles, such as fired kaolinitic particles, as well as partially sintered bauxite. The porous particulates may further be porous natural ceramic materials, such as lightweight volcanic rocks, like pumice, as well as perlite and other porous "lavas" like porous (vesicular) Hawaiian Basalt, porous Virginia Diabase and Utah Rhyolite. Such naturally occurring materials may be strengthened or hardened by use of modifying agents to increase the ability of the naturally occurring material to resist deformation. A starch binder may be employed.

Suitable polymeric materials for use as the porous particulate in such applications include thermosetting resins, such as polystyrene, a styrene-divinylbenzene copolymer, a polyacrylate, a polyalkylacrylate, a polyacrylate ester, a polyalkyl acrylate ester, a modified starch, a polyepoxide, a polyurethane, a polyisocyanate, a phenol formaldehyde resin, a furan resin, or a melamine formaldehyde resin.

The composites may be prepared by conventional processes, such as electrofusion, spray-drying and pelletization. In a preferred embodiment, the composites are prepared by placement of the porous particulate into a dilute solution or suspension of the well treatment agent and permitting the porous particulate to imbibe the well treatment agent.

The composite may further be composed of a well treatment agent and a calcined metal oxide, such as those disclosed in U.S. Pat. No. 9,029,300. Such composites include those where a well treatment agent is adsorbed onto a nano-sized calcined porous substrate of high surface area.

The porosity and permeability of the calcined porous substrate may be such that the well treatment agent may also be absorbed into the interstitial spaces of the porous substrate. In an embodiment, the surface area of the calcined porous substrate of such composites may be between from about 1 $m^2/g$ to about 10 $m^2/g$, in some cases between from about 1.5 $m^2/g$ to about 4 $m^2/g$, the diameter of the calcined porous substrate may be between from about 0.1 to about 3 mm, in some cases between from about 150 to about 1780 micrometers, and the pore volume of the calcined porous substrate may be between from about 0.01 to about 0.10 g/cc. The porous metal oxide is typically spherical and insoluble in well fluids under subterranean conditions, such as at temperatures less than about 250° C.

The porous substrate may be a metal oxide, such as alumina, zirconium oxide and titanium oxide. The support of the coated composite is typically a calcined metal oxide of high surface area such as alumina, zirconium oxide, aluminosilicate and titanium oxide. The substrate may further include silica. Typically, the porous substrate is alumina.

The adsorbent may be prepared by:

(a) mixing a metal oxide hydrosol (such as aluminum oxide hydrosol) containing a hydrate of the metal oxide or activated metal (such as activated alumina) and an additive component selected from carbon (such as carbon black) or a high molecular weight natural organic material (such as wood flour and starch) which is insoluble in aqueous solution up to a temperature of 50° C. and carbon with a solution of hydrolyzable base to form a mixture;

(b) introducing the mixture in dispersed form into a water-immiscible liquid having a temperature of from about 60° to 100° C., whereby gel particles are formed;

(c) aging the gel particles in the liquid at the temperature and subsequently in an aqueous base, such as an aqueous ammonia solution;

(d) recovering the aged particles; and then (e) calcining the recovered particles.

During calcination, the additive component is removed. The calcined particles have a lower bulk density when the additive component is present during calcinations than when the additive component is not present. Typically, the bulk density of the composite is between from about 75 to about 150 $lb/ft^3$. In addition, combustion of the additive component during calcinations of the hydrosol results in formation of pores of the calcined metal oxide.

The metal oxide hydrosol may optionally contain a silica-containing substance which in their non-soluble form is coprecipitated with the metal oxide particles. The silica-containing substance is preferably a low density silica, such as that prepared by hydrolysis of silicon tetrachloride in an oxyhydrogen flame and known under the designation pyrogenic silica.

In an embodiment, spherical metal oxide adsorbent may be prepared from a concentrated metal oxide hydrosol of a pH value in the range of about 3 to about 5 which, in turn, is prepared by dissolving metal in hydrochloric acid and/or metal chloride in aqueous solution or by dissolving metal hydroxychloride in water, the concentration of which is adjusted so that metal oxide derived from the sol amounts to 15 to 35% by weight, preferably to 20 to 30% by weight of the mass of the calcined particles. Metal oxide hydrate and/or activated metal, preferably of an average particle diameter of maximally 10μ, is then added to the hydrosol in an amount so that the metal oxide content amounts to 65 to 85% by weight, preferably 70 to 80% by weight of the calcined particles. Optionally, pyrogenic silica may be added to the hydrosol such that the $SiO_2$ content of the calcined particles amounts to 10 to 40% by weight. A soft to medium-hard wood flour may then added to the mixture, the wood flour being ground to a finer particle size such that it is present in a quantity of 5 to 35% by weight, preferably 10 to 25% by weight relative to the mass of the calcined particles. The hydrosol containing the wood flour may then be mixed with a concentrated aqueous solution of hexamethylene tetraamine and then sprayed or dropped into a column filled with the mineral oil of a temperature of 60° C. to 100° C. The gel particles are then allowed to remain at the temperature of precipitation for a period of time from 4 to 16 hours; thereafter the gel particles are aged for 2 to 8 hours in aqueous ammonia solution, washed with water, dried at 100° C. to 150° C., or preferably at from about 120° C. to about 200° C., preheated to 250° C. to 400° C. and calcined at a temperature of 600° C. to about 1000° C.

Alternative methods for making metal oxide adsorbent are further disclosed in U.S. Pat. No. 4,013,587, herein incorporated by reference.

In a preferred embodiment, when the metal oxide adsorbent is alumina adsorbent, the adsorbent may be prepared by hydrolyzing aluminum alkoxides to render nano sized alumina, drying to remove water and then introducing the dried aluminum in a dispersed form into an oil at a temperature of from about 60° to 100° C., whereby gel particles are formed. The gel particles are then aged in the liquid and subsequently in an aqueous ammonia solution, recovered and then calcined. Nano sized alumina may be produced having an average diameter in the range from about 0.4 mm to about 1 mm.

The well treatment agent once released (desorbed) from the calcined oxide may then flow into the environs once a fissure(s) is created in the coating. In some instances, the well treatment agent is released from the calcined oxide after a fissure is formed in the coating. In such instances, the well treatment agent flows into the environs after a fissure appears in the coating layer.

The composite may further be composed of a well treatment agent and a calcined metal oxide, such as those disclosed in U.S. Pat. No. 9,029,300. Such composites include those where a well treatment agent is adsorbed onto a nano-sized calcined porous substrate of high surface area.

In another embodiment, the support of the composite may be prepared by mixing a clay (such as bentonite or bauxite) or a metal oxide of high surface area with a pore generating component such as an organic compound or a component capable of releasing carbon dioxide (such as calcium carbonate), and then pelletizing. The pellets may then be sintered. The release of carbon dioxide during sintering enhances the porosity of the sintered product. In another embodiment, the mixture may be sprayed onto a proppant such as sand, aluminosilicate or ceramic and then dried and exposed to higher temperature to generate porosity.

The well treatment agent is preferably water soluble, hydrocarbon soluble or both water and hydrocarbon soluble.

In a preferred embodiment, the well treatment agent may be at least one member selected from the group consisting of demulsifying agents (both water-in-oil or oil-in-water), corrosion inhibitors, scale inhibitors, salt inhibitors, paraffin inhibitors, gas hydrate inhibitors, salt formation inhibitors, asphaltene dispersants, foaming agents, oxygen scavengers, hydrogen sulfide scavengers, water soluble tracers, oil soluble tracers, biocides and surfactants as well as other agents wherein slow release into the production well is desired.

The well treatment agent may be a solid or liquid. In an embodiment, where the well treatment agent is a solid, it can be dissolved in a suitable solvent, thus making it a liquid. Where the well treatment agent is a solid, the well treatment agent may remain intact on the solid adsorbent until the flow of a solubilizing liquid. For instance, where the well treatment agent is an inhibitor for scales, corrosion, salts or biocidal action, the treatment agent may solubilize (desorbed from the adsorbent) into produced water. In the absence of water flow, the well treatment agent may remain intact on the solid adsorbent. As another example, solid inhibitors for paraffin or asphaltene solubilize into the hydrocarbon phase of produced fluid.

In a preferred embodiment, the coated composite described herein effectively inhibits, controls, prevents or treats the formation of inorganic scale formations being deposited in the formation and wellbore as well as in tubulars, conduits, etc. The coated composites described herein are particularly efficacious in the treatment of scales of calcium, barium, magnesium salts and the like, including barium sulfate, calcium sulfate, and calcium carbonate scales. The coated composites may further have applicability in the treatment of other inorganic scales, such as zinc sulfide, iron sulfide, etc.

Suitable scale inhibitors are anionic scale inhibitors.

Preferred scale inhibitors include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof.

Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred.

Further useful, especially for brines, are chelating agents, including diethylenetriaminepentamethylene phosphonic acid and ethylenediaminetetra acetic acid.

Suitable salt inhibitors include any of the fructans or fructan derivatives, such as inulin and inulin derivatives, as disclosed in U.S. Patent Publication No. 2009/0325825, herein incorporated by reference.

Exemplary of the demulsifying agents that are useful include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of the such di-functional products. Especially preferred as non-ionic demulsifiers are oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide etc.

Exemplary paraffin inhibitors include ethylene/vinyl acetate copolymers, acrylates (such as polyacrylate esters and methacrylate esters of fatty alcohols), and olefin/maleic esters.

Exemplary corrosion inhibitors useful herein include but are not limited to fatty imidazolines, alkyl pyridines, alkyl pyridine quaternaries, fatty amine quaternaries and phosphate salts of fatty imidazolines.

Gas hydrate treating chemicals or inhibitors that are useful include but are not limited to polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Exemplary asphaltene treating chemicals include but are not limited to fatty ester homopolymers and copolymers (such as fatty esters of acrylic and methacrylic acid polymers and copolymers) and sorbitan monooleate.

Suitable foaming agents include, but are not limited to, oxyalkylated sulfates or ethoxylated alcohol sulfates, or mixtures thereof.

Exemplary surfactants include cationic, amphoteric, anionic and nonionic surfactants. Included as cationic surfactants are those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group include quaternary ammonium halide or quaternary amine, such as quaternary ammonium chloride or a quaternary ammonium bromide. Included as amphoteric surfactants are glycinates, amphoacetates, propionates, betaines and mixtures thereof. The cationic or amphoteric surfactant may have a hydrophobic tail (which may be saturated or unsaturated) such as a C12-C18 carbon chain length. Further, the hydrophobic tail may be obtained from a natural oil from plants such as one or more of coconut oil, rapeseed oil and palm oil.

Preferred surfactants include N,N,N trimethyl-1-octadecammonium chloride: N,N,N trimethyl-1-hexadecammonium chloride; and N,N,N trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Exemplary oxygen scavengers include triazines, maleimides, formaldehydes, amines, carboxamides, alkylcarboxylazo compounds cumine-peroxide compounds morpholino and amino derivatives morpholine and piperazine derivatives, amine oxides, alkanolamines, aliphatic and aromatic polyamines.

The hydrogen sulfide scavenger may be an oxidant, such as an inorganic peroxide, e.g. sodium peroxide, or chlorine dioxide, or an aldehyde, e.g. of 1 to 10 carbons such as formaldehyde or glutaraldehyde or (meth)acrolein or an amine based scavenger, such as a triazine or a hexamine.

The well treatment agent may also be a tracer which are hydrocarbon soluble and/or water soluble tracer. Coated composites containing tracers may be used to monitor the reservoir. As produced fluid passes through or circulates in the well, the tracer released from the support slowly dissolves over a generally constant rate over an extended period of time in the water or hydrocarbons which are contained in the formation and/or well. The coated composites thus provide a continuous supply of the tracer into the targeted area. Gradual dissolution of the tracers insures that they are available to produced fluids for extended periods of time.

Suitable tracers include dyes (such as phenoxazone dyes, fluroescein, pyridinium betaines dyes, solvatochromatic dyes, Oregon Green, Cascade Blue, *Lucifer* yellow, Auramine O, tetramethylrhodamine, pysranine, sulforhodamines, hydroxycoumarins; polysulfonated pyrenes; cyanines, hydroxylamines, neutral red, acridine orange; acids (such as picric acid and salicylic acid) or salts thereof; ionizable compounds (such as those which provide ammonium, boron, chromate, etc., ions); and radioactive materials (such as krypton-85); isotopes; genetically or biologically coded materials; microorganisms; minerals; and high molecular weight synthetic and natural compounds and polymers (such as oligonucleotides, perfluorinated hydrocarbons like perfluoro butane, perfluoro methyl cyclopentane and perfluoro methyl cyclohexane).

The tracer may also be a chelate, such as ethylene diamine tetra acetic acid (EDTA)) or a salt thereof. U.S. Pat. No. 4,264,329, herein incorporated by reference, discloses acceptable metal chelates formed by reacting aryl substituted ethylene diamine tetra acetic acid and a metal ion selected from the consisting of lead, cadmium and zinc. Such chelates react with fluorogenic agents, such as fluorescamine and o-phthalaldehyde. Fluorescence spectroscopy is then used to detect the chelate.

The tracer may also include carbon quantum dots which may be detected by a wide variety of methods, such as those disclosed in U.S. Pat. No. 10,280,737

In an embodiment, any of the well treatment agents referenced may further be tagged with a tracer (such as those referenced above). When the well treatment agent is tagged, the taggant may or may not be immobilized into the interstitial spaces of the support. Where the well treatment agent is tagged, the taggant joined with the well treatment agent to form the tagged well treatment agent must be compatible with fluids naturally present in the reservoir and within the rock itself as well as be compatible with the fluids injected into the reservoir as part of the formation treatment. (The term "joined" shall refer to the union of the taggant and well treatment agent to form a single particulate and shall include, but not be limited to, the bonding or complexing of the taggant onto the well treatment agent.) Typically, the particle size of the taggant is between from about 0.001 microns to about 100 microns. In some instances, the particle size of the taggant is less than or equal to 0.05 microns. The amount of taggant in the tagged well treatment agent is normally from about 1 to 50 weight percent, preferably from about 1 to about 10 weight percent.

In an embodiment, the well treatment agent(s) of the coated composite may be surface treated to render it more hydrophobic and/or oleophobic upon being released from the support and into the environs through the fissure(s) of the coating of the composite. For instance, hydrophobicity and/or oleophobicity of the well treatment agent may be enhanced by attaching a surface modifying agent comprising a fluorine containing moiety, organo-silicon containing moiety or both a fluorine containing moiety and an organo-silicon containing moiety onto the surface of the well treatment agent(s). [As used herein, "attaching" shall include, but not be limited to, adhering, grafting, bonding (including covalently bonding) or otherwise linking the hydrophobic and/or oleophobic moiety to the surface of the well treatment agent(s) or to the coating of the coated composite containing the well treatment agent(s).]

Further, hydrophobicity and/or oleophobicity may be imparted to the well treatment agent(s) by attaching to the surface of the well treatment agent(s) a carboxyl, hydroxyl, amino, imino, amido, thio or phosphonic acid radical, cyano, sulfonate, carbonate or a mixture thereof In an embodiment, the hydrophobicity and/or oleophobicity of the well treatment agent(s) immobilized on or within the support of the composite may be modified by soaking the well treatment agent in a bath containing the surface modifying agent and then drying the modified well treatment agent. Alternatively, the well treatment agent may be rendered hydrophobic and/or oleophobic by first adsorbing the well treatment agent onto or within the support of the composite and then subjecting the composite to heat.

In an embodiment, the organo-silicon containing moiety may be attached onto the surface of the well treatment agent(s) by reacting the well treatment agent(s) with a silane, polysiloxane or a polysilazane.

Examples of organo-silicon containing materials are those having the formula $R^1_{4-x}SiA_x$ or $(R^1_3Si)_yB$ as well as organo(poly)siloxanes and organo(poly)silazanes containing units of the formula:

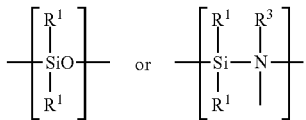

where $R^1$ may be the same or different and is a hydrocarbon radical containing from 1 to 100, such as 1 to 20 carbon atoms and 1 to 12, preferably 1 to 6 carbon atoms and $R^3$ may be hydrogen or a hydrocarbon or substituted hydrocarbon having 1 to 12, preferably 1 to 6 carbon atoms. In addition, $R^1$ may be a substituted, hydrocarbon radical such as halo, particularly a fluoro-substituted hydrocarbon radical. The organo(poly)siloxane may further contain additional units of the formula: $R^5_2SiO_2$ where $R^5$ is a halogen such as a chloro or fluoro substituent.

In an embodiment, the organo-silicon containing compound may be an organo(poly)siloxane or organo(poly)silazane of a number average molecular weight of at least 400, usually between 1000 and 5,000,000.

The substituent A in $R^1_{4-x}SiA_x$ may be hydrogen, a halogen such as chloride, OH, $OR^2$ or

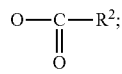

wherein B in the above structural formula may be $NR^3_{3-y}$, $R^2$ a hydrocarbon or substituted hydrocarbon radical containing from 1 to 12, typically 1 to 4 carbon atoms. $R^3$ is hydrogen or has the same meaning as $R^1$ and x is 1, 2 or 3, y is 1 or 2.

Preferably, $R^1$ is a fluoro-substituted hydrocarbon. Preferred are such fluoro-substituted hydrocarbons are those of the structure:

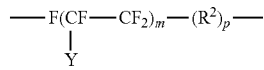

where Y is F or $C_nF_{2n+1}$; m is 4 to 20 and n is 1 to 6; $R^2$ is alkyl containing from 1 to 4 carbon atoms and p is 0 to 18. Also, fluoro-substituted hydrocarbons may be of the structure:

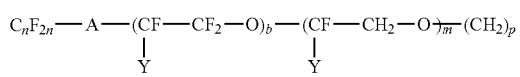

where A is an oxygen radical or a chemical bond; n is 1 to 6, y is F or $C_nF_{2n}$; b is at least 1, such as 2 to 10; m is 0 to 6 and p is 0 to 18.

Preferred organo-silicon materials include halogenated siloxanes, halogenated alkoxysiloxanes such as perfluoroalkoxysiloxane (PFOSi), alkoxy halogenated alkoxysilanes, such as alkoxy-perfluoroalkoxysilane; alkoxyacetylacetonate halogenated polysiloxanes, such as alkoxyacetylacetonate-perfluoroalkoxysiloxane, alkoxy-alkylsilylhalides; polyalkylsiloxanes, such as polydimethylsiloxanes, and alkoxyacetylacetonate-polyalkylsiloxanes, such as alkoxyacetylacetonate (acac) polydimethylsiloxanes.

In an embodiment, the fluorinated hydrocarbon is $R_f$—$(CH_2)_p$—X where $R_f$ is a perfluorinated hydrocarbon group including an oxygen substituted hydrocarbon group, such as a perfluorinated alkyl group or a perfluorinated alkylene ether group and p is 0 to 18, preferably 0-4, and X is a polar group such as a is carboxyl, like of the structure —(C=O)—OR; and R is hydrogen, perfluoroalkyl, alkyl or substituted alkyl containing from 1 to 50 carbon atoms.

Examples of perfluoroalkyl groups are those of the structure F—(CFY—$CF_2)_m$ where Y is F or $C_nF_{2n+1}$; m is 4 to 20 and n is 1 to 6.

Examples of perfluoroalkylene ether groups are those of the structure:

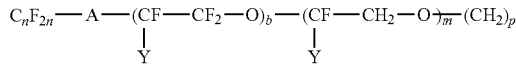

where A is an oxygen radical or a chemical bond; n is 1 to 6, Y is F or $C_nF_{2n}$; b is 2 to 20, m is 0 to 6, and p is 0 to 18, preferably 2 to 4 and more preferably 2.

Preferred fluorinated materials are esters of perfluorinated alcohols such as the alcohols of the structure F—(CFY—$CF_2)_m$—$CH_2$—$CH_2$—OH where Y is F or $C_nF_{2n+1}$; m is 4 to 20 and n is 1 to 6.

Further preferred as fluorinated hydrocarbons are perfluorinated hydrocarbons of the structure $R_f$—$(CH_2)_p$—X where $R_f$ is a perfluoroalkylene ether group or a perfluorinated alkyl group such as those described above, p is an integer of from 0 to 18, preferably 0 to 4, and X is a carboxyl group, preferably a carboxylic ester group containing from 1 to 50, preferably from 2 to 20 carbon atoms in the alkyl group that is associated with the ester linkage.

Further preferred as fluorinated hydrocarbons are perfluorinated hydrocarbons of the structure $R_f$—$(CH_2)_p$—Z where $R_f$ and p are as defined above, preferably $R_f$ is a perfluoroalkylene ether group such as those described above, and p is from 2 to 4, and Z is a phosphorus acid group. Examples of phosphorus acid groups are:

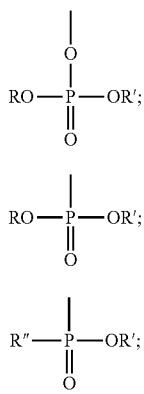

where R" is a hydrocarbon or substituted hydrocarbon radical having up to 200, such as 1 to 30 and 6 to 20 carbons, R" can also include the perfluoroalkyl groups mentioned above, and R' is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

Preferably, the phosphorus acid is of formula II where R and R' are H.

In an embodiment, the fluorine containing moiety may be of the formula $R_f$—$(CH_2)_p$— where $R_f$ is a perfluorinated alkyl group or contains a perfluorinated alkylene ether group and p is 2 to 4, preferably 2. In an embodiment, the fluorine containing moiety may have a number average molecular weight of less than 2000.

Examples of perfluorinated groups for the fluorine containing moiety are those of the structure:

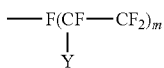

where Y is F or $C_nF_{2n+1}$; m is 4 to 20 and n is 1 to 6. A preferred oligomeric or perfluoroalkylene ether group is of the structure:

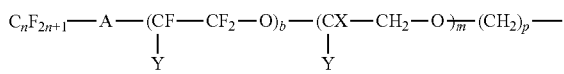

where A is an oxygen radical or a chemical bond such as $CF_2$; n is 1 to 20, preferably 1 to 6; Y is H, F, $C_nH_{2n+1}$ or $C_nF_{2n+1}$; b is at least 1, preferably 2 to 10, m is 0 to 50, and p is 1 to 20.

Modification of the well treatment agent(s) of the composite may further provide reduced surface energy, such that movement of water and other liquids is facilitated once the well treatment agent is released into the well since the well treatment agent (upon being released from the coated composite) and into the environs through the fissure(s) will be repelled.

In addition to inhibiting or preventing the formation of contaminants within a formation or wellbore, the composites may be used to inhibit or prevent the formation of contaminants onto the surface of a conduit in an underground reservoir or a conduit which extends to or from the underground reservoir. Further, the coated composites may be used in controlling the release of a well treatment agent into a well or within a formation or onto the surface of a tubular, conduit, etc. during a well treatment operation. Such release may be controlled for the life of the coated composite.

In an embodiment, the coated composite may be transported into the wellbore, formation, tubular or conduit in a carrier fluid. The carrier fluid could be a fracturing fluid or acidizing fluid. The well treatment agent may be released into a targeted area in the well, formation, tubular, conduit, etc. and thus control or inhibit the formation of contaminants onto such surfaces A continuous supply of the well treatment agent into the targeted area may be provided as disassociated well treatment agent enters the environs through the fissure(s) of the coating.

The coated composite enhances the stability of the pumped fluid. This is especially evident when the coated composite is a component of a fracturing fluid. Some well treatment agents are known to adversely affect one or more physical properties of the pumped fluid when they are prematurely released. For instance, well treatment agents which are acidic in nature (such as acidic scale inhibitors, like phosphonic acid), once they are no longer immobilized onto a support or incorporated into the pores of a porous or high surface area support, may decrease the pH of the pumped fluid. As an example, a decrease in pH in the pumped fluid has been noted when an acidic scale inhibitor is desorbed from a high surface area water-insoluble adsorbent. Such a decrease is minimized or prevented when a coating is applied onto the composite. The coated composites described herein prevent or mitigate the premature release of the well treatment agent. This enhances compatibility of the well treatment agent with the pumped fluid as compared to when the well treatment agent is pumped into the well uncoated.

Suitable carriers include aqueous based systems like brines, such as a saturated potassium chloride, sodium chloride, zinc bromide, calcium bromide, sodium brines and mixtures thereof, salt water such as seawater or fresh water. In other embodiments, the coated composite may be carried into the formation, tubular or conduit in a liquid hydrocarbon, surfactant or gas, such as nitrogen or carbon dioxide. The coated composites may further be injected into the formation in liquefied gas, such as liquefied natural gas or liquefied petroleum gas as well as in foams, such as carbon dioxide, nitrogen and carbon dioxide/nitrogen. The fluid is preferably aqueous, steam or gas.

In an embodiment, the coated composites may be slurried into a brine or into an aliphatic or aromatic hydrocarbon. A thickener may optionally be added to the slurry to provide a viscous fluid. Suitable viscosifiers include clay and clay-like materials and conventional polysaccharides such as cellulose, starch, and galactomannan gums as well as polyvinyl alcohols, polyacrylates, polypyrrolidones and polyacrylamides and mixtures thereof.

The amount of coated composite present in the composition is typically between from about 15 ppm to about 100,000 ppm. When the carrier fluid is brine, the weight percentage of the coated composite in the composition is generally between from about 0.02 to about 2 weight percent.

The composition may further contain between from 0 to about 10 weight percent of an inorganic salt. Suitable inorganic salts include KCl, NaCl, and $NH_4Cl$.

As stated, the coated composite is particularly applicable for use in a stimulation operation. When used in a treatment operation employing proppant, the proppant may have an apparent specific gravity between from about 1.05 to about 4.0. In an embodiment, the proppant may be be lightweight (having an apparent specific gravity less than or equal to 2.65, preferably less than or equal to 2.45, more preferably less than or equal to 2.25, in some cases less than or equal to 2.0, in other cases less than or equal to 1.75, in other cases less than or equal to 1.5, in still other cases less than or equal to 1.25 and in other cases less than or equal to about 1.06) as well as heavier proppants such as those having an apparent specific gravity of 2.65 or greater, such as sand, alumino, aluminosilicates, ceramics and bauxite.

In an embodiment, the coated composites may be used in hydraulic fracturing operations where small fractures have been created or enlarged. For instance, the coated composites may be used in hydraulic fracturing operations wherein fractures have been propped open with proppants having a particle size no greater than 150 μm. In a preferred embodiment, the coated composites are used in near-wellbore fracturing operations. This may be particularly be the case in the treatment, inhibition or prevention of asphaltenes which typically occurs near wellbore due to the drops in pressure.

When used in fracturing, the particle size of the coated composite may be greater than or equal to and in some cases less than or equal to the particle size of the proppant. The well treatment agent may then be slowly released into the fracture while or after being solubilized. Such applications are especially useful in the treatment of secondary, dendritic fractures extending transversely to the trajectory of a primary fracture. Such fracture patterns are not uncommon in the treatment of low permeability formations, such as shale. In an embodiment, the well treatment coated composite may be used in those applications where a primary fracture is formed in the near field around the wellbore and dendritic fractures extend from the primary fracture far field.

In addition to their use in hydraulic fracturing, the coated composites may be included in fluids used in well treating applications near wellbore and may be directed toward improving wellbore productivity and/or controlling the production of formation sand. Particular examples include gravel packing as well as in a frac pack operation.

Where the coated composite includes a tracer, a well treatment agent, or where a tracer is tagged onto the well treatment agent, the coated composite may be used to monitor hydrocarbon production. In an embodiment, the amount of tracer in the coated composite may be from about 1 to 50 weight percent, preferably from about 14 to about 40 weight percent. In some instances, the amount of tracer in the coated composite may be as low as 1 ppm. The minimum amount of tracer in the fracturing fluid is that amount sufficient to permit detection within the produced fluid.

Since the tracers may be detected in recovered produced fluids, the method described herein does not require downhole equipment for detection. Typically, fluids transported out of the well are evaluated and the tracer(s) which dissociates from the composite and into the well through the fissure(s) are identified on the fly or at a location distant from the wellbore.

Monitoring of the tracers within fluids may be by visual inspection, chemical analysis, standard spectroscopy methods such as infrared, ultraviolet and mass spectroscopy, spectrophotometric methods, chromatography (including liquid chromatography), ultraviolet light, fluorescence spectroscopy, electrochemical detection, infrared, radioactive analysis, x-ray analysis, PCR techniques combined with sequential analysis, electron capture detection or optical fibers. The selected detection method is based on the properties of the tracer. For instance, where the tracer is an aromatic compound, the method of detection is preferably by ultraviolet light. Where the tracer exhibits fluorescence, the detection method may be by fluorescence spectroscopy.

In an embodiment, the tracers which are released through the fissure(s) of the coating may be used to identify fluids produced from the well and in a preferred embodiment, identify the zone from which the fluid was produced. (The term "zone" as used herein may refer to separate formations within a well or separate areas within a single formation within the well.) Fluid pumped into the production well at different locations may contain coated composites having qualitatively and/or quantitatively tracers.

When multiple zones are being fractured within the wellbore, coated composites may be introduced into different zones wherein the tracer of the composite (or the tracer tagged onto the well treatment agent) is distinguishable by being qualitatively (and/or quantitatively) detectable. The distinguishable tracers are selected such that the tracer of a composite pumped into one zone is unable to mask the characteristics of a tracer of a composite pumped into another zone when released into the environs through the fissure(s) on the coating. The zone within the formation from which recovered fluid is produced may be identified from the tracer in the recovered fluid. Further, the amount of hydrocarbons produced from one or more of the zones may be determined.

Thus, for instance, a first treatment fluid having a coated composite of a tracer immobilized onto or within the support may be introduced into a first zone of a formation. A second treatment fluid having coated composites comprising qualitatively and/or quantitatively distinguishable and immobilized tracers from the fluid introduced into the first zone may be introduced into a second zone of a formation. The zone from which the fluid is produced may be determined by identifying the tracer which is released into the produced fluid. (It is understood that the terms "first" and "second" need not be sequential and only denote the order of addition of the fluids into the formation or the order of addition of zones treated in a formation. In other words, the first zone is merely penultimate to the second zone. Thus, for example, the "first zone" may refer to a third zone of a multi-zone formation and the "second zone" may refer to a sixth zone of a multi-zone formation; the "first treatment fluid" may be a fourth treatment fluid introduced while the "second treatment fluid" may be the eighth treatment fluid introduced.)

In addition to monitoring different zones in hydrocarbon production wells and determining the zone in which hydrocarbons have been produced from the formation, the coated composites may also be used to monitor produced water (such as zinc containing water), oil and gas for flow assurance and for maintaining regulatory compliance. The ability to analyze the fluids on-site, quickly and frequently, further assists operators to detect flow assurance, asset integrity and process problems early enabling them to take preventative action to minimize the risks of production loss and to adapt the treatment operation.

The coated composites may also be used to sweep a production well in an enhanced oil recovery (EOR) operation, such as flooding. Coated composites may be introduced into injection fluid and the injection fluid introduced into the formation. The injection fluid may be introduced by being pumped into one or more injection wells. Typically, the coated composites are soluble in the injection fluid.

The detection of the well treatment agent released from the coated composites in fluids produced from the production well is indicative that the sweep, i.e., removal of the oil from pore spaces within the formation, has been completed.

Further, tracers of coated composites may also be used to determine sites of flowback water and produced water as well as for detection or early warning of phenomena such as water breakthrough.

In yet other embodiments, the coated composites may be used as a tracer to determine fluid flow paths through the subterranean formation and into produced fluids. For instance, the coated composites may be introduced into an injection fluids during at least one of water flooding, steam assisted gravity drainage, steam flooding, cyclic steam stimulation, or other enhanced oil recovery stimulation processes.

In an embodiment, different coated composites having tracers which distinguishable from each other may be introduced in an aqueous fluid into different injection wells. Fluids produced from the well may be analyzed to determine if water breakthrough has occurred in the production well. By using coated composites having different tracers, the injection well from which the water in the breakthrough water was pumped may be determined by optical spectroscopy. The injection well, into which the water in the breakthrough water has been determined to have been initially introduced, can be shut off. Thus, the coated composites can be used to optimize enhancement of hydrocarbons during secondary recovery operations by shutting down the injection well feeding into the formation into which sweep efficiency has been maximized. Thus, the flow of water from the injection well into that portion of the formation having been completely swept may be terminated.

In an embodiment, the coated composites may be introduced into an aqueous fluid which is then introduced into injection wells. The aqueous fluid introduced into each of the injection wells contains a composite having a qualitatively distinguishable tracer as well treatment agent. The aqueous fluid serves to maintain pressure in the hydrocarbon-bearing reservoir. The pressure is maintained above the bubble point. Should tracers be detected in produced fluid from the production well, the operator would know to take remedial action and shut down the injection well from which the tracers had originally been introduced. The injection well, once shut down, may be repaired to prevent further flow of aqueous fluid into the production well.

EXAMPLES

All percentages set forth in the Examples are given in terms of volume units except as may otherwise be indicated.

Example 1

Asphaltene destabilization. A crude oil (Crude Oil #1) containing 8.42% asphaltene content was analyzed. Table I shows the results of the asphaltene inhibitor screening using the destabilization testing for untreated crude and crude oil treated with (50 ppm) of an asphaltene inhibitor (AI), commercially available as FlowSolve 150 from Croda Oil & Gas.

TABLE I

| Chemical | % Asphaltene Precipitation at 15 min |
| --- | --- |
| Crude Oil #1 Untreated | 29% |
| AI | Trace |

The untreated blank sample immediately began to precipitate and after 15 minutes had precipitated 29% while the treated crude oil show no precipitation.

Table II shows results of several columns prepared using a mixture of an alumina oxide proppant (90 wt. %) and 10 wt. % of solid particles containing uncoated composite or coated (epoxy resin) composite or composite after applying stress. The substrate of the composite was calcined aluminosilicate and the well treatment agent was the asphaltene inhibitor. Untreated crude oil was flowed through the column and the effluent samples were collected 60 mLs (5 pore volumes) at a time. The column was maintained at 60° C. for the length of the experiment in a water bath. The efficiency of the treatment was monitored using the asphaltene destabilization testing. Table II shows the percentage of asphaltene deposition of the samples with the corresponding pore volumes 10, 20, 30, 40, etc.

TABLE II

| Chemical | 10% Slow Release inhibitor 20/40 | 4% coated Slow Release inhibitor 20/40 | 4% coated Slow Release inhibitor 20/40 stress 5Kpsi |
| --- | --- | --- | --- |
| Untreated | 29 | 29 | 29 |
| 10 PV | 0 | 0 | 0 |
| 20 PV | Trace | 0 | 0 |
| 30 PV | 1 | 25 | |
| 40 PV | 4 | trace | |
| 50 PV | 8 | 17 | |
| 60 PV | 25 | 21 | |

Example 2

The same testing method of Example 1 was repeated. A crude oil (Crude Oil #2) containing 2% asphaltene content was analyzed. Table III shows the results of the asphaltene inhibitor screening using the destabilization testing for untreated crude and crude oil treated with (50 ppm) of an asphaltene inhibitor (AI), commercially available as FlowSolve 150 from Croda Oil & Gas.

TABLE III

| Chemical | % Asphaltene Precipitation at 15 min |
| --- | --- |
| Crude Oil #2 Untreated | 17% |
| AI | Trace |

Table IV compares the results of columns prepared using uncoated and coated samples. For uncoated samples, 60 pore volumes were collected before the asphaltene precipitated and packed similar to the untreated blank sample.

TABLE IV

| Pore Volume | 10% AI 20/40 | 4 wt % Coated Composite 20/40 | 9 wt % Coated Composite 20/40 | 4 wt % Coated Composite 20/40 stress 5Kpsi | 9 wt % Coated composite 20/40 stress 5Kpsi |
| --- | --- | --- | --- | --- | --- |
| Blank | 17% | 17% | 17% | 17% | 17% |
| 4 | 0% | 17% | 17% | 0% | 3% |
| 8 | 0% | 17% | 17% | 2% | 8% |
| 12 | 0% | 17% | 17% | 0% | 7% |
| 16 | 0% | 17% | 17% | 0% | 0% |
| 20 | 0% | 17% | 17% | 0% | 3% |
| 24 | 0% | 17% | 17% | 0% | 5% |
| 28 | 0% | 17% | 17% | 0% | 7% |
| 32 | 0% | 17% | | 0% | 7% |
| 36 | 0% | 17% | | 0% | 7% |

TABLE IV-continued

| Pore Volume | 10% AI 20/40 | 4 wt % Coated Composite 20/40 | 9 wt % Coated Composite 20/40 | 4 wt % Coated Composite 20/40 stress 5Kpsi | 9 wt % Coated composite 20/40 stress 5Kpsi |
|---|---|---|---|---|---|
| 40 | 0% | | | trace | 7% |
| 44 | 0% | | | trace | 7% |
| 48 | 0% | | | trace | 8% |
| 52 | 0% | | | trace | 8% |
| 56 | 0% | | | trace | 8% |
| 60 | trace | | | 3% | 8% |
| 64 | trace | | | 3% | 17% |
| 68 | trace | | | 3% | |
| 72 | flock | | | 3% | |
| 76 | flock | | | 5% | |
| 80 | flock | | | 5% | |
| 84 | flock | | | 5% | |
| 88 | flock | | | 8% | |
| 92 | flock | | | 8% | |
| 96 | Flock | | | 8% | |
| 100 | Flock | | | | |

In the case of 4% coated samples, untreated crude oil was flowed through the column and the effluent samples were collected 48 mLs at a time. Thirty six pore volumes were collected however, all asphaltenes deposited similar to the untreated blank sample. No inhibition was observed, demonstrating that the 4% coating delayed the release of the asphaltene inhibitor. Table IV shows the percentage of asphaltene deposition of the samples with the corresponding pore volumes 4, 8, 12, 16, etc. FIG. 1 shows the asphaltene deposition test of the effluent samples after 24 hours.

The 4% coated was mixed with proppant a 90/10 ratio then exposed to 5 kpsi stress for 10 minutes. The mixture was used in a column test. One hundred pore volumes were collected without asphaltenes depositing similar to the untreated blank sample. This demonstrates that after the applied stress, the asphaltene inhibitor was efficiently released and inhibited the asphaltenes from deposition. Table IV shows the percentage of asphaltene deposition of the samples with the corresponding pore volumes 4, 8, 12, 16, etc.

Example 3

A column was prepared using a 9 wt. % coated composite sample. Twenty eight pore volumes were collected however asphaltenes deposited similar to the untreated blank sample. No inhibition was observed. This demonstrated that the 9% coating delayed the release of the asphaltene inhibitor. Table III shows the percentage of asphaltene deposition of the samples with the corresponding pore volumes 4, 8, 12, 16, etc.

A sample made of 90% proppant and 10% (w/w) of the 9 wt. % coated composite was exposed to 5 kpsi stress for 10 minutes. When the mixture was used in a column test and crude oil #1 flown through, eighty pore volumes were collected before the asphaltenes depositing similar to the untreated blank sample. This demonstrates that after the applied stress, the asphaltene inhibitor is partially released leading to the conclusion that a higher stress is needed to completely release the inhibitor. It also means that the 9% coated particles are releasing the inhibitor slower at 5 kpsi than the 4% coated particles. Table II further illustrates that the lifetime of a well may be extended by using the coated composite in conjunction with the uncoated composite.

Example 4

Asphaltene destabilization. A crude oil (Crude Oil #1) having an asphaltene content of 8.42% was analyzed. Table IV shows the results of asphaltene inhibitor screening using the destabilization testing for untreated crude and crude oil treated with 50 ppm of the AI of Example 1.

TABLE IV

| Chemical | % Asphaltene Precipirtation at 15 min |
|---|---|
| Crude Oil #2 Untreated | 29% |
| AI | trace |

Figure 2:
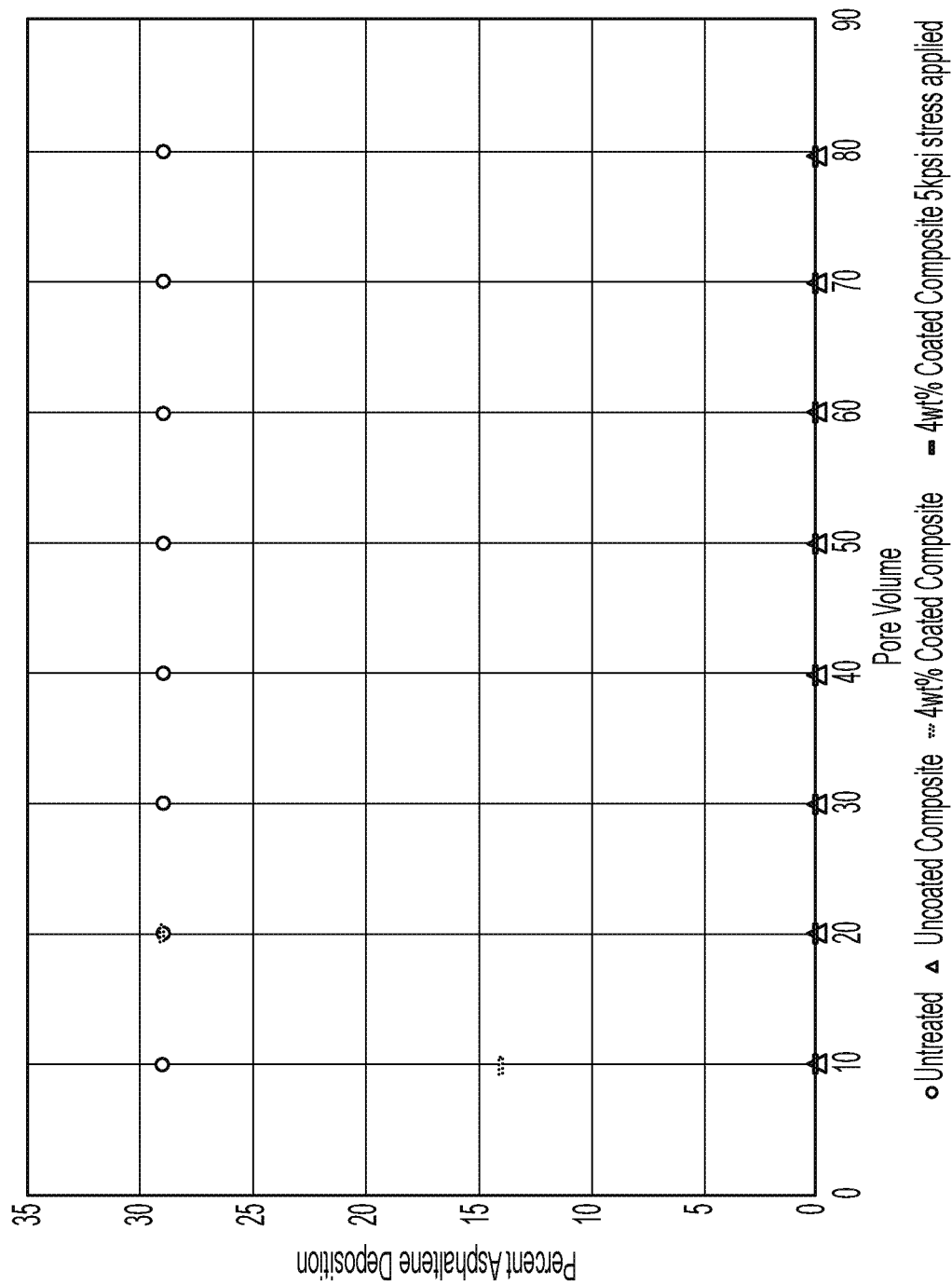

The column of the alumina oxide proppant (90 wt. % and 10 wt. % of the solid particles was then prepared. The substrate of the composite was calcined aluminosilicate and the well treatment agent was the asphaltene inhibitor. Untreated Crude Oil #1 was then flowed through the column and effluent samples were collected 120 mLs (10 pore volumes) at a time. FIG. 2 shows the Solid Inhibitor 1 and Solid Inhibitor 2 versus untreated crude oil wherein:

Solid Inhibitor 1 showed at 80 pore volumes asphaltene inhibition of the dispersion was 100% compared to the untreated oil.

Solid Inhibitor 2 showed at 10 pore volumes only a small amount of inhibitor was released and by 20 pore volumes there was no inhibition. After release was triggered, Solid Asphaltene Inhibitor 2 showed 100% inhibition of asphaltenes at 80 pore volumes. This demonstrates that until the release mechanism is triggered, the asphaltene inhibitor does not release.

Figure 3:
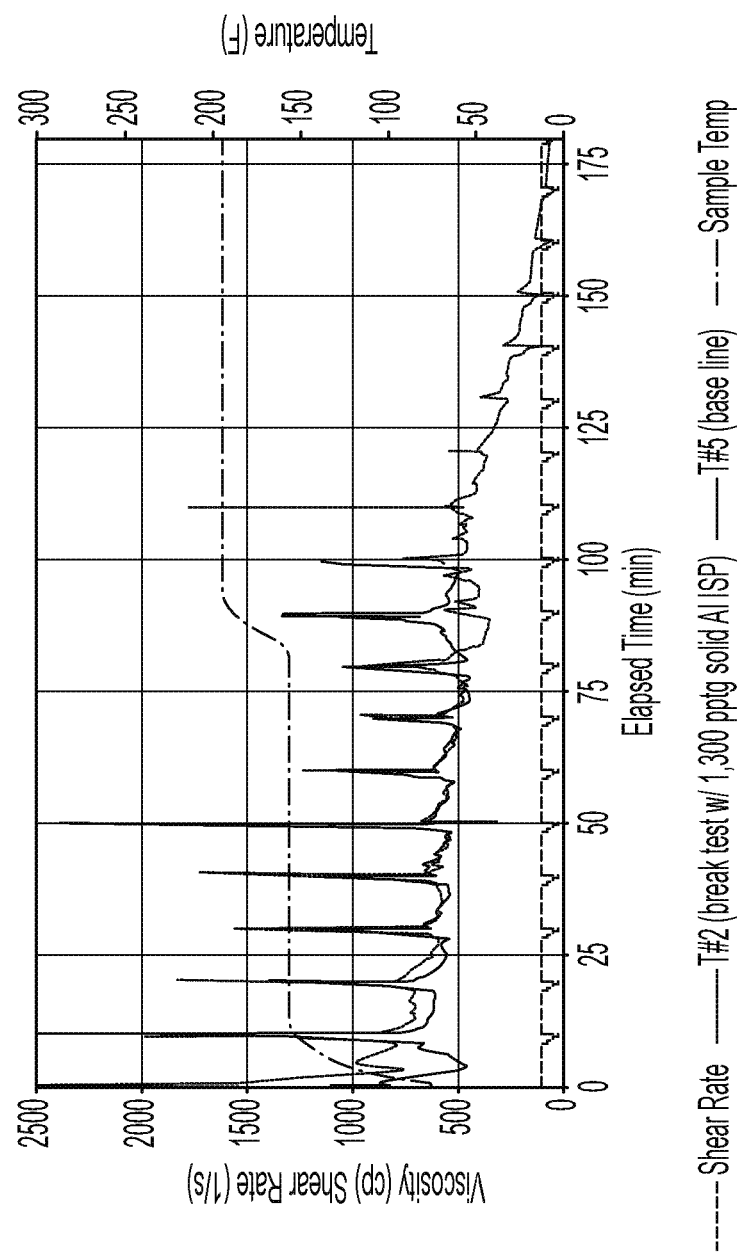
FIG. 3 shows a comparison of rheology of a fracturing fluid with the composite versus a fluid without the composite.

Since the composite containing the asphaltene inhibitor was to be delivered into the formation with the fracturing fluid, compatibility with the fracturing fluid to ensure no negative impact on fluid rheology was evaluated. FIG. 3 shows the rheology of the fracturing fluid exposed to the composite compared to the control fluid have no exposure to the composite. As can be seen the interaction with the crosslinked gel performance is negligible at 1,300 pounds per thousand gallon (pptg) of solid inhibitor applied.

Figure 4:
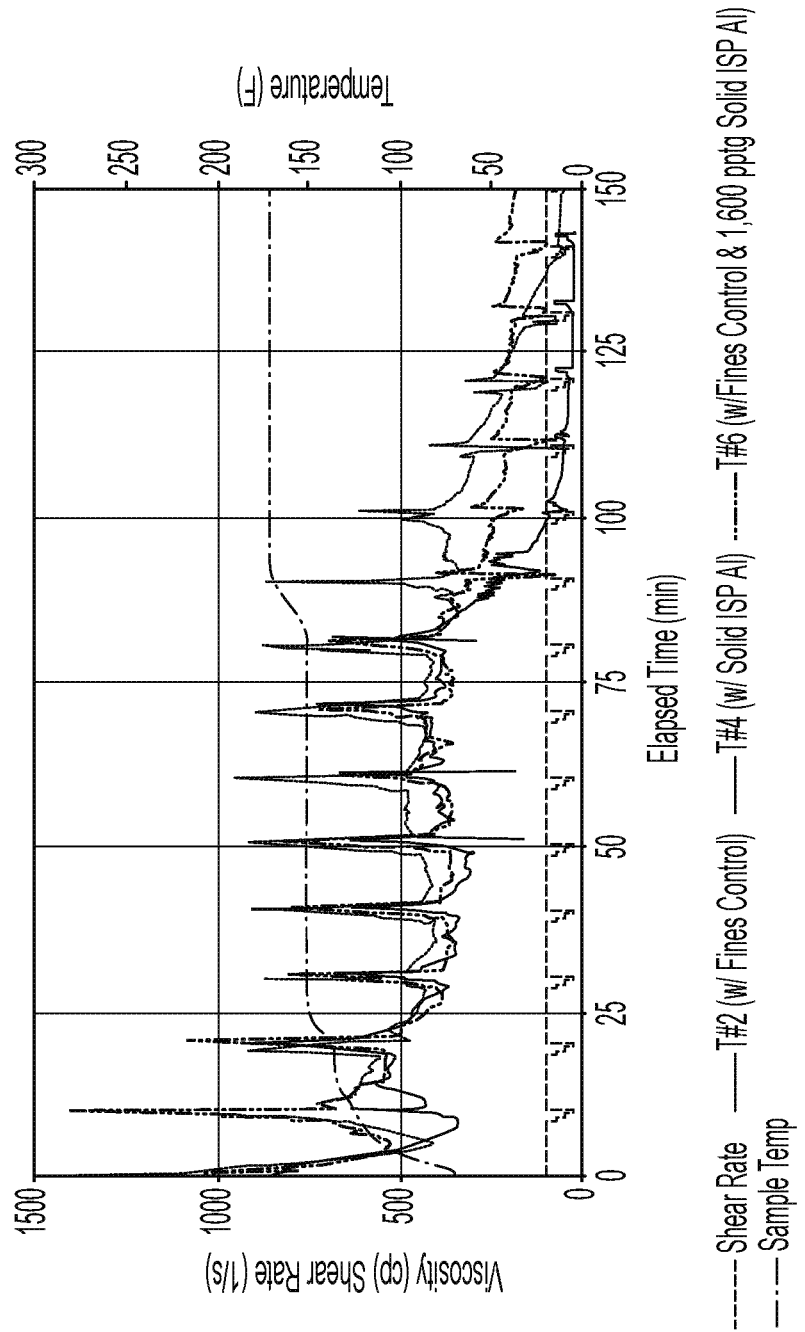
FIG. 4 shows a comparison of rheology of a fracturing fluid containing a fines control additive without the composite, a fluid with the composite, and a fracturing fluid containing both composite and fines control additive.

Since a fines control additive was incorporated into the fracturing fluid on two of the zones completed, rheology tests were performed to determine if any impact could be observed. FIG. 4 shows the rheology of the optimized frac fluid containing breaker with the addition of the fines control additive and a coated composite for comparison.

FIGS. 3 and 4 confirm that the composite is compatible with the fracturing fluid and can be easily applied and optimized as necessary. Based on these results, a large amount of the composite may be applied during the fracturing operations without limitation due to frac fluid compatibility. This allows for sufficient placement of the coated composite for extending protection and treatment life.

The Examples demonstrate slow release of the well treatment agent throughout the proppant pack without affecting conductivity. This provides enhanced protection from formation damage in areas beyond traditional squeezes. Slow release of the well treatment agent can delay the precipitation of contaminants as the wells are being produced. With the delay mechanism, the release of the well treatment agent can be further postponed to release later in the life of the well.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

What is claimed is:

1. A method of stimulating a subterranean formation penetrated by a wellbore comprising:
   (a) pumping under pressure into the wellbore a composite comprising a well treatment agent immobilized onto a surface of a support or into pores of a porous support wherein a protective coating of an organic polymer or inorganic material surrounds the composite;
   (b) transporting the composite into an enlarged or created fracture in the subterranean formation;
   (c) producing hydrocarbon fluids from the enlarged or created fracture;
   (d) applying stress to the composite and creating at least one crack or fissure in the organic polymer or inorganic material;
   (e) releasing the well treatment agent from the support and through the at least one created crack or fissure in the coating, wherein the well treatment agent is not released from the support and into the wellbore until the at least one crack or fissure is formed in the protective coating; and
   (f) inhibiting or minimizing formation of contaminants in the wellbore with the released well treatment agent.

2. The method of claim 1, wherein the subterranean formation is stimulated by slickwater fracturing, hydraulic fracturing, acid fracturing or frac packing.

3. The method of claim 1, wherein the subterranean formation is stimulated by hydraulic fracturing and further wherein the well treatment agent of the composite introduced into two or more fractured zones is either (i) a tracer or (ii) tagged with a tracer and wherein the tracer of the composites tracers are qualitatively distinguishable.

4. The method of claim 1, wherein at least 2,000 psi is applied onto the coated-composite.

5. The method of claim 4, wherein at least 8,000 psi is applied onto the coated composite.

6. The method of claim 5, wherein at least 12,000 psi is applied onto the coated composite.

7. The method of claim 1, wherein the well treatment agent immobilized onto the surface of the support or into the pores of the porous support has a surface which is hydrophobic and/or oleophobic.

8. The method of claim 1, wherein the well treatment agent is selected from the group consisting of asphaltene inhibitors, scale inhibitors, corrosion inhibitors, paraffin inhibitors, salt inhibitors, gas hydrate inhibitors, asphaltene inhibitors, oxygen scavengers, biocides, foaming agent, emulsion breakers, surfactants, hydrogen sulfide scavengers, water soluble tracers, oil soluble tracers and mixtures thereof.

9. The method of claim 8, wherein the well treatment agent is an asphaltene inhibitor, a scale inhibitor or a mixture thereof.

10. The method of claim 1, wherein the organic polymer is a resin, plastic or sealant.

11. The method of claim 1, wherein the organic polymer or inorganic material is selected from the group consisting of phenol formaldehyde resins, melamine formaldehyde resins, urethane resins, epoxy resins, polyamides, polyethylene, polystyrene, furan resins, zirconium silicate, zinc silicate or mixtures thereof.

12. The method of claim 1, wherein the support of the composite is:
   (a) a water-insoluble adsorbent; or
   (b) a calcined metal oxide.

13. A method of stimulating a subterranean formation penetrated by a wellbore comprising:
   (a) pumping into the wellbore under pressure a fluid comprising (i) proppant and (ii) a composite comprising a well treatment agent immobilized onto a surface of a support or into pores of a porous support wherein a protective coating surrounds the composite, the protective coating being is coated with an organic polymer or inorganic material;
   (b) transporting the proppant and composite into an enlarged or created fracture in the subterranean formation;
   (c) producing hydrocarbon fluids from the enlarged or created fracture;
   (d) applying stress to the proppant and composite and creating at least one crack or fissure in the protective coating;
   (e) releasing the well treatment agent from the support into the well through the at least one created crack or fissure in the protective coating while the created or enlarged fracture remains open with the proppant, and further wherein the well treatment agent is not released from the support and into the well until the at least one crack or fissure is formed in the protective coating; and
   (f) inhibiting or minimizing formation of contaminants in the wellbore with the released well treatment agent.

14. The method of claim 13, wherein the proppant has an apparent specific gravity from about 1.06 to about 4.0.

15. The method of claim 13, wherein at least 8,000 psi is applied onto the coated composite.

16. The method of claim 15, wherein at least 10,000 psi is applied onto the coated composite.

17. The method of claim 16, wherein at least 12,000 psi is applied onto the coated composite.

18. The method of claim 17, wherein at least 15,000 psi is applied onto the coated composite.

19. The method of claim 13, wherein the well treatment agent is selected from the group consisting of asphaltene inhibitors, scale inhibitors, corrosion inhibitors, paraffin inhibitors, salt inhibitors, gas hydrate inhibitors, asphaltene inhibitors, oxygen scavengers, biocides, foaming agent, emulsion breakers, surfactants, hydrogen sulfide scavengers, water soluble tracers, oil soluble tracers and mixtures thereof.

20. The method of claim 19, wherein the well treatment agent is an asphaltene inhibitor, a scale inhibitor or a mixture thereof.

21. The method of claim 13, wherein the organic polymer is selected from the group consisting of phenol formaldehyde resins, melamine formaldehyde resins, urethane resins, epoxy resins, polyamides, polyethylene, polystyrene, furan resins, zirconium silicate, zinc silicate or mixtures thereof.

22. A method of controlling the rate of release of a hydrocarbon soluble, water soluble or both hydrocarbon and water soluble well treatment agent into a dendritic fracture extending from a primary fracture during a hydraulic fracturing operation, the method comprising:
   (a) pumping into near field primary fractures and far field secondary fractures propped open with a proppant a composite comprising the well treatment agent immobilized onto a surface of a support or into the pores of a porous support, wherein the composite is coated with a protective coating of an organic polymer or inorganic material;

(b) applying stress to the composite and creating at least one crack or fissure in the he protective coating; and (c) releasing the well treatment agent from the composite through the at least one crack or fissure and further wherein the well treatment agent is not released from the composite until the at least one crack or fissure is formed in the protective coating.

23. The method of claim 22, wherein the particle size of the coated composite is less than the transverse dimension of the dendritic fracture extending from a primary fracture.

24. A method of controlling release of a well treatment agent into a well, into a conduit extending to or from a well, or onto a surface of a subterranean formation penetrated by a well, the method comprising:

(a) pumping into the well during a well treatment operation a composite comprising the well treatment agent immobilized onto a surface of a support or into pores of a porous and further wherein a protective coating an organic polymer or inorganic material surrounds the composite; and (b) inhibiting or controlling formation of contaminants within the well by delaying release of the immobilized well treatment agent from the support into the well until at least one crack or fissure is created in the protective coating of the composite.

25. The method of claim 24, wherein the well treatment operation is a stimulation or sand control operation and further wherein the composite is capable of withstanding pressures of at least 1,000 psi.

* * * * *

UNITED STATES PATENT AND TRADEMARK OFFICE
CERTIFICATE OF CORRECTION

PATENT NO. : 10,961,444 B1
APPLICATION NO. : 16/672161
DATED : March 30, 2021
INVENTOR(S) : Naima Bestaoui-Spurr, Marty J. Usle and Frances H. DeBenedictis It is certified that error appears in the above-identified patent and that said Letters Patent is hereby corrected as shown below:

In the Claims

Claim 3: Column 25, Lines 37-38:
Delete "tracer of the composites"

Claim 13(a): Column 26, Line 12:
Delete "is coated with"

Claim 24(a): Column 27, Line 21:
After coating, add --of--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*